United States Patent [19]

Meiring et al.

[11] Patent Number: 5,727,571
[45] Date of Patent: Mar. 17, 1998

[54] COMPONENTS FOR SMOKING ARTICLES AND PROCESS FOR MAKING SAME

[75] Inventors: Robert Leonard Meiring, Winston-Salem; Vernon Brent Barnes, Clemmons; Max Warren Cole, Winston-Salem; Keith Stanley Moser, Mocksville; Jeffrey Kane Rogers, Winston-Salem, all of N.C.

[73] Assignee: R.J. Reynolds Tobacco Co., Winston-Salem, N.C.

[21] Appl. No.: 306,929

[22] Filed: Sep. 15, 1994

Related U.S. Application Data

[63] Continuation of Ser. No. 856,239, Mar. 25, 1992, abandoned.

[51] Int. Cl.$^6$ ........................................ A24C 5/18
[52] U.S. Cl. ........................ 131/194; 131/359; 131/360; 131/280
[58] Field of Search .................... 131/194, 195, 131/360, 361, 364, 359, 77, 78, 84.1–84.4, 280; 44/535, 541

[56] References Cited

U.S. PATENT DOCUMENTS

| | | |
|---|---|---|
| Re. 24,424 | 2/1958 | Samfield et al. |
| 1,156,609 | 10/1915 | Mewborne |
| 2,433,877 | 1/1948 | Wells et al. |
| 2,485,670 | 10/1949 | Sowa et al. |
| 2,845,933 | 8/1958 | Samfield et al. |
| 3,012,562 | 12/1961 | Merritt |
| 3,042,552 | 7/1962 | Rosenberg |
| 3,085,580 | 4/1963 | Muth |
| 3,098,492 | 7/1963 | Wurzburg et al. |
| 3,141,462 | 7/1964 | Block et al. |
| 3,203,432 | 8/1965 | Green et al. |
| 3,223,090 | 12/1965 | Stubel et al. |
| 3,364,935 | 1/1968 | Moshy et al. |
| 3,404,691 | 10/1968 | Moshy et al. |
| 3,410,279 | 11/1968 | Moshy et al. |
| 3,467,109 | 9/1969 | Block et al. |
| 3,528,434 | 9/1970 | Halter et al. |
| 3,760,815 | 9/1973 | Deszyck |
| 3,894,544 | 7/1975 | Egri |
| 3,931,824 | 1/1976 | Miano et al. |
| 3,932,081 | 1/1976 | Buchmann et al. |
| 3,968,804 | 7/1976 | Kelly et al. |
| 4,083,371 | 4/1978 | Beringer et al. |

(List continued on next page.)

FOREIGN PATENT DOCUMENTS

| | | |
|---|---|---|
| 267250 | 7/1965 | Australia. |
| 0113595 | 7/1984 | European Pat. Off. |
| 0 174 645 A3 | 3/1986 | European Pat. Off. |
| 0167370 | 8/1986 | European Pat. Off. |
| 0 405 190 A2 | 1/1991 | European Pat. Off. |
| 275420 | 5/1951 | Switzerland. |
| 282369 | 7/1929 | United Kingdom. |
| 909272 | 10/1962 | United Kingdom. |
| 1055445 | 1/1967 | United Kingdom. |
| 1397923 | 6/1975 | United Kingdom. |
| 2064296 | 6/1981 | United Kingdom. |
| 2 229 349 | 9/1990 | United Kingdom. |

OTHER PUBLICATIONS

International Symposium on Supercritical Fluids, R. Eggers, "On the Situation of Continous Extraction of Solids By Means of Supercritical Gases" Oct. 17–19, 1988.

*Primary Examiner*—Jennifer Bahr
*Attorney, Agent, or Firm*—Grover M. Myers; David G. Conlin

[57] ABSTRACT

Disclosed are new fuel components for smoking articles such as cigarettes, new methods of making such fuel components, and cigarettes or other smoking articles incorporating the new fuel components. Fuel components for smoking articles are formed by continuously extruding a composition to form a preselected shape, circumscribing the continuously extruded composition with a layer of material to form a wrapped rod or composite member, preferably bonding the fuel element to the layer of material, and cutting the resulting composite member into predetermined lengths for use in assembling smoking articles.

22 Claims, 2 Drawing Sheets

U.S. PATENT DOCUMENTS

| | | |
|---|---|---|
| 4,164,948 | 8/1979 | Beringer et al. . |
| 4,333,484 | 6/1982 | Keritsis . |
| 4,340,072 | 7/1982 | Blot et al. . |
| 4,347,855 | 9/1982 | Lanzilloti et al. . |
| 4,391,285 | 7/1983 | Burnett et al. . |
| 4,425,289 | 1/1984 | Lee et al. . |
| 4,448,208 | 5/1984 | Friedrich et al. . |
| 4,506,684 | 3/1985 | Keritsis . |
| 4,510,950 | 4/1985 | Keritsis et al. . |
| 4,516,590 | 5/1985 | Teng . |
| 4,557,057 | 12/1985 | Weiss et al. . |
| 4,578,878 | 4/1986 | Mitzuta et al. . |
| 4,598,721 | 7/1986 | Stiller et al. . |
| 4,625,737 | 12/1986 | Keritsis et al. . |
| 4,821,749 | 4/1989 | Toft et al. . |
| 4,823,817 | 4/1989 | Luke . |
| 4,874,000 | 10/1989 | Tamol et al. . |
| 4,880,018 | 11/1989 | Graves, Jr. et al. . |
| 4,893,637 | 1/1990 | Hancock et al. . |
| 4,917,128 | 4/1990 | Clearman et al. ............... 131/360 X |
| 4,980,744 | 12/1990 | Cogswell . |
| 5,105,838 | 4/1992 | White et al. ............... 131/365 |
| 5,129,409 | 7/1992 | White et al. . |

5,727,571

1

COMPONENTS FOR SMOKING ARTICLES AND PROCESS FOR MAKING SAME

This is a continuation of application Ser. No. 07/856,239 filed on Mar. 25, 1992 and abandoned upon the filing of the instant application.

FIELD OF THE INVENTION

The present invention is related to smoking articles such as cigarettes and, particularly, to fuel components for such smoking articles, to smoking articles such as cigarettes which incorporate fuel components made in accordance with this invention, and to methods and apparatus for making such components and articles.

BACKGROUND OF THE INVENTION

Cigarettes, cigars and pipes are popular forms of tobacco smoking articles. Many smoking products and smoking articles have been proposed through the years as improvements upon, or as alternatives to, these popular forms of tobacco smoking articles. Examples of improved smoking articles are the cigarettes and pipes described in U.S. Pat. Nos. 4,793,365, 4,771,795, 4,756,318, 4,714,082, and 4,708,151, which generally comprise a fuel element, a physically separate aerosol generating means, and a separate mouthend piece.

In the European Patent Publications 0174645(A2) and 0212234(A2), the disclosures of which are hereby incorporated by reference, there are disclosed a number of alternative forms of smoking articles which typically embody (1) an aerosol generating cartridge comprising a fuel element for generating heat for transfer to an aerosol forming material which may contain a tobacco flavoring material, (2) a sleeve or jacket circumscribing the cartridge, the sleeve preferably including an insulating material around the fuel element and a tobacco containing material around the aerosol forming material or, alternatively, an insulating material around the entire aerosol generating cartridge and, optionally, (3) a mouthend piece, which may contain a filter element. Generally, the aerosol generating cartridge comprises a capsule containing an aerosol generating material with a fuel element at one end.

In copending U.S. application Ser. No. 07/373,133 filed Jun. 27, 1989, an extruded cigarette is disclosed wherein a carbonaceous material is extruded around a wrapped aerosol generating material so that the carbonaceous material and aerosol generating material co-extend longitudinally with a barrier layer therebetween. Alternatively, the aerosol generating material can circumscribe the carbonaceous material with a barrier layer therebetween.

Prior to the present invention, in making cigarettes and other smoking articles which have utilized carbonaceous fuel elements with a separate aerosol generating means, it has generally been necessary to first separately form the carbonaceous fuel element, and then insert the formed fuel element into the cigarette structure with the correct orientation. The fuel element has typically been formed by making an aqueous paste of carbon or carbonaceous material, extruding it through a die having the desired cross-sectional shape, solidifying the extruded paste into a self supporting carbonaceous plug, and cutting the solidified extrudate into fuel elements having the desired length.

Getting such fuel elements into the cigarette or other smoking article has been a complex process, which required orienting of the fuel element, feeding of the oriented fuel element to a device which would combine the fuel element

2 with the physically separate aerosol generating means, typically by inserting the oriented fuel element into the open end of a hollow metallic tube which contained a substrate bearing an aerosol forming material. The combined fuel/ aerosol generator typically then had to be oriented, fed to an insertion apparatus and inserted into remainder of the cigarette structure. See, e.g., U.S. Pat. No. 4,893,637, which described apparatus and methods for making components of a smoking article. A method for making a sleeve or jacket component having a removable support member is described wherein the support member, preferably a hollow tube, is circumscribed with a compressible and resilient material using a novel forming device in a continuous manner for high speed production. The formation of the smoking device involved insertion of the fuel element/aerosol generator into the sleeve or jacket while removing the removable support member.

The present invention provides methods for continuously forming a fuel component comprising a sleeve or jacket circumscribing an extruded fuel composition for use in smoking articles such as, for example, cigarette-type smoking articles.

This invention further provides novel fuel components and apparatus for making such fuel components, which solve many of the manufacturing complexities and provide improved smoking articles.

SUMMARY OF THE INVENTION

In accord with the present invention a fuel component for a smoking article is formed by continuously extruding a composition to form a preselected shape, circumscribing the continuously extruded composition with a layer of material to form a wrapped rod or composite member, preferably bonding the fuel element to the layer of material, and cutting the resulting composite member into predetermined lengths for use in assembling smoking articles. Preferably, the layer of material which circumscribes the fuel element acts to retain the fuel element in the fuel component. Preferably the retaining layer comprises a compressible, resilient material, such as a fibrous insulating material. The circumscribing material can advantageously comprise a plurality of layers, e.g. a layer of insulating material, such as glass fibers, a layer of material containing a source of flavor for the smoke, such as tobacco or tobacco paper, or other materials containing tobacco extracts or flavorants. If desired, any additional layers can be circumscribed with an additional insulating layer. Preferably the circumscribing layer(s) is (are) overwrapped with paper or other suitable material for convenience of handling and for defining an outer diameter. For example, various types of cigarette paper can be used to continuously overwrap the circumscribing layers prior to the cutting step.

Prior to the present invention, it was considered impractical to directly extrude a fuel element into the fuel component for a number of reasons. One reason was that the fuel composition, when extruded, had very little structural integrity, and thus is very unlikely to survive the rigors of the necessary manufacturing process. Another problem resulted from the inherent nature of extrusion. Extruders vary considerably in the rate of output, due to variations in the mix, rheology of the materials going through the die, and other factors. Yet the types of machines required to assemble fuel components for smoking articles require a constant supply of material for consistent output. Other problems include the structural integrity of the finished component—extrusion of a straight fuel into a circumscribing layer was considered to provide a dropout problem. In other words, either before or after lighting, the fuel element itself might fall out of the circumscribing layer(s).

It has now been found that it is possible to extrude fuel elements directly and manufacture fuel components in an efficient manufacturing process, and to provide a fuel component in which the fuel element is bound to the circumscribing retaining layer of material, thus preventing dropout problems.

In a preferred embodiment of the invention, the component formed comprises an elongate extruded fuel element, circumscribed by and bonded to a retaining layer, preferably formed of a compressible resilient material, the retaining layer being circumscribed with a paper wrapping material or the like. As used herein, "bound" and "bonded" refer to the material in the retaining layer being bonded to or adhering to the outer surface of the extruded fuel element, in a manner such that some portion of the retaining material, the fuel element, or an agent creating adhesion or a bond must be broken or disrupted in order to separate the material from the extrudate.

In certain preferred embodiments, the extruded fuel element comprises a carbonaceous material useful as a fuel, preferably comprising a paste of carbon, binder and water, with or without other flavorants or materials, that is subsequently dried to form the fuel element.

In certain preferred embodiments, the fuel element also comprises tobacco or a source of tobacco or other flavor. For example, the fuel element may contain up to about 20% by weight of tobacco, preferably about 5% to about 15% by weight, to impart tobacco smoke taste to the resulting smoke product.

The compressible, resilient retaining layer is preferably formed using a fibrous material in the form of a web having a width sufficient to wrap around the extruded composition and having a thickness sufficient to provide the desired outer diameter for the component.

In some preferred embodiments, a plurality of resilient layers are utilized. Especially preferred are embodiments in which the fuel element is circumscribed with a layer of insulator, such as glass fibers, which in turn is circumscribed with a layer of tobacco paper, which in turn is circumscribed with another layer of glass fibers.

Preferably, the wrapped rod is further circumscribed with an outer paper-like wrapper to form a composite member to provide a predetermined outer diameter for the component.

There are a variety of factors which contribute to the success of the present invention. One preferred aspect of the present invention is to control the moisture content of the carbonaceous slurry which is extruded into the fuel element. It has been found that the moisture content of the carbonaceous slurry should be maintained between about 20% and 45% by weight, preferably between about 34% and 40% by weight, depending on the circumstances of extrusion and the composition of the fuel mixture, to obtain a slurry which has rheological properties which permit extrusion, yet allow manipulation of the extrudate, as described below, to produce a coherent fuel element.

The level within those ranges at which the water content should be maintained for optimum extrudability depends to some degree on the exit temperature of the extruder and die which are used to form the extrudate. For example, piston type extruders, although not continuous, tend to extrude at lower temperatures, and thus lower moisture contents in the fuel composition can be used. However, continuous screw-type extruders tend to produce the extrudate at a higher temperature, e.g., 50°–80° C. In such cases, much of the water flashes out of the fuel composition when the extrudate exits the die. The extrudate cools as a result of such evaporation, but the resultant extrudate may have too little water content to permit further handling in the manufacturing operations. Thus higher initial water contents should be used in such circumstances.

Another preferred aspect of the present invention is the use of the actual production rate of the extrudate from the extruder to control the speed of the machine which circumscribes the layer of material around the extruded fuel element. Preferably this is done by engaging the extrudate with a rate measuring means after it exits the extruder, and using the rate thus determined to control the speed of the wrapping means. This approach assists in compensating for the variances in speed of delivery sometimes encountered with the output of extruders.

Another way to compensate for the output variance of the extruder is to include a delay loop in the feed line between the extruder and the wrapping means. The delay loop should be sufficient in size and geometry to compensate for the normal variance of the extrudate supply, and should avoid sharp bends in the extrudate line, in order to avoid cracking or breaking the extrudate. Preferably both the control of the wrapping means and the delay loop are utilized to stabilize the rate of supply of extrudate to the wrapping means.

Another aspect of this invention which is highly preferred in the manufacturing operation is the use of an air foil in supporting the extrudate during the course of travel between the extruder and the wrapping means. An air foil is a support means by which the extrudate traveling between the extruder and the wrapping means is at least partially supported by air jets, rather than by mechanical contact. Such support can be important in avoiding production of non-uniform, mechanically defective fuel components. The air foil also functions to cool and dry the extrudate somewhat, while transporting it to the wrapping device.

A very important element in the successful operation of the present invention is the method by which the fuel element is bound to the circumscribing material. Preferably, the circumscribing material is treated with a bond-inducing material before being wrapped around the fuel element. For example, in the case of glass fiber circumscribing material, the bond between the circumscribing glass fiber layer and the carbonaceous fuel element can be obtained by reactivating the pectin binding agent which is normally included as a small percent by weight of the glass fiber material as commercially obtained. Preferably, the glass fiber material is wetted with a small amount of water before being used to wrap the extrudate. It is preferred that the glass fibers be wetted with the small amount of water sufficiently upstream of its contact with the extrudate so that the pectin has an opportunity to be wetted and activated by the added moisture. The amount of moisture added by this procedure is small, preferably just enough to activate the pectin to hold the fuel element in the fuel component. Typically, the amount of added water is in the order to 1–2% of the final fuel element weight. The water can be applied by a small aperture tube, preferably a tube having an opening of 18–20 microns. It is also preferred to employ a spreader roller, so that the water applied to the resilient material is spread over at least a portion of the area of the glass fiber mat which will contact the outer surface of the fuel element.

The glass fiber mat or other circumscribing material is preferably provided and supplied in the manner described in U.S. Pat. No. 4,893,637, which describes a funnel or trumpet forming means, having arcuate surfaces to guide the edges of the web around the fuel element. Where more than one web-like layer is to be used, a plurality of forming means can be used to form each of the layers around the fuel element. However, the same web-like materials can be formed simultaneously using a single forming means in accordance with that patent. For example, to make fuel components having the sandwich type structure disclosed above, i.e., using two layers of glass fibers with an interleaved layer of tobacco paper, the tobacco paper layer can be fed into the same forming means simultaneously with one or the other of the glass fiber layers. In that case, the forming means guides the edges of both the glass fiber layer and the tobacco paper so that both layers circumscribe the fuel element.

The final stages of the manufacture of the fuel component are the wrapping of the component in cigarette or other suitable paper, sealing the paper so that the component will hold together, and cutting it to desired lengths. Preferably this is all done on the same device, and a number of machines are commercially available which will accomplish those tasks. Presently preferred is the KDF-2, a cigarette filter making machine manufactured by Hauni, of Hamburg, Germany. It is greatly preferred that the speed of the KDF-2 machine be controlled by the linear speed of the extrudate being issued by the extruder, as mentioned above.

Undoubtedly the greatest benefit attained from the present invention is that of speed and productivity. Under the prior process, the extrudate had to be passed through a long series of drying means, such as airfoils, in order to dry segments of the fuel material so that they could be handled and stored. The segments then had to be gathered, loaded into trays which in turn were loaded into feeding machines for feeding fuel elements into the insertion machine in the proper orientation, as described for example in U.S. Pat. No. 4,782,644, issued Nov. 8, 1988.

The new process is amenable to production of fuel elements in multiples, which then can joined to the other portions of the smoking articles with well known cigarette making technology. Operating at full speed, the KDF-2 can handle about 400 linear feet per minute of extrudate. Cut in multiples of 4 or more, the process can thus produce thousands of fuel components per minute.

The prime purpose of the airfoil is to furnish minimal-contact transfer between the extruder and the wrapping/cutting device, rather than as a means for drying the extrudate. With the direct injection method made possible by the present invention, the fuel element is essentially still high in water content, e.g., about 28% to about 30%, when it is included in the fuel component. Most of the drying takes place while the fuel elements are within the fuel components, with the end moisture content being about 2% to about 10%, preferably about 4% to about 6% by weight. Therefore, most of the drying equipment is obviated, as well as the trays, the handling, the feeding machinery, the insertion machinery and in effect the whole insertion process.

Not only are the processing and necessary equipment and handling substantially reduced, but the resulting products are substantially improved. The fact that the fuel element is bound to the surrounding material is effective in preventing dropout of the fuel element. The reduction in processing means that the fuel elements are subjected to far less bumping, chipping, cracking and mishandling, resulting in a substantial improvement in overall product quality, and a substantial reduction in scrap rate.

Moreover, the location of the fuel elements within the fuel component is more consistent as compared to the results of the insertion process. Thus the ultimate smoking products can be made more consistent, without smoker difficulty in attempting to light a fuel element which has disappeared into the cigarette during the insertion process.

Preferably, the fuel elements of the present invention are used in conjunction with a physically separate aerosol generating means which comprises a substrate bearing an aerosol forming material. Preferably the aerosol generating means is located longitudinally adjacent the fuel element, preferably spaced 1–10 mm behind the fuel element in order to reduce wicking. The preferred substrate is a paper substrate, as disclosed in Clearman et al. U.S. application Ser. No. 723,350, filed Jun. 28, 1991, the disclosure of which is incorporated herein by reference.

Preferably, smoking articles such as cigarettes incorporating the fuel elements of the present invention further utilize a mouthend piece at the mouth end of the cigarette, to convey the aerosol produced by the cigarette to the smoker. Preferred mouthend pieces include a segment of rolled tobacco paper located downstream of the aerosol generating means, with a low efficiency filter, e.g., a polypropylene filter located downstream of the tobacco paper plug, at the mouthend of the cigarette. Suitable mouthend pieces are disclosed in the forementioned Clearman et al. U.S. application Ser. No. 723,350, filed Jun. 28, 1991.

During smoking, heat from the burning fuel element is rapidly transferred to the aerosol generating means in the cigarettes using components of this invention and this heat causes volatilization of the aerosol forming material contained therein, which in turn is produced to the user a "smoke-like" aerosol through the mouthend piece of the smoking article.

In addition to the aforementioned benefits, some preferred components of the present invention are capable of providing an aerosol which is chemically simple, consisting essentially of air, oxides of carbon, water, aerosol former including any desired flavors or other desired volatile materials, and trace amounts of other materials.

Other preferred embodiments incorporate some amounts of tobacco in the fuel composition, and/or contain some form of tobacco, e.g. cut filler, tobacco paper, tobacco extract, etc. in the insulator layer surrounding the fuel element, and/or surrounding the aerosol generator. Such smoking articles deliver an improved flavor to the smoke.

The WTPM produced by the preferred cigarettes of this invention preferably has little or no measurable activity as measured by the Ames test, i.e., preferably there is little or no significant dose response relationship between the WTPM produced by preferred cigarettes of the present invention and the number of revertants occurring in standard test microorganisms exposed to such products. According the the proponents of the Ames test, a significant dose dependent response indicates the presence of mutagenic materials in the products tested. See Ames et al., *Mut. Res.*, 31: 347–364 (1975); Nagao et al., *Mut. Res.*, 42: 335 (1977).

As used herein, and only for the purposes of this application, "aerosol" is defined to include vapors, gases, particles, and the like, both visible and invisible, and especially those components perceived by the user to be "smoke-like," generated by action of the heat from the burning fuel element upon substances contained within the aerosol generating means, or elsewhere in the article. As so defined, the term "aerosol" also includes volatile flavoring agents and/or other volatile agents, regardless of whether they produce a visible aerosol.

As used herein, "carbonaceous" refers to the use of at least about 50 percent carbon in the solid material content of the fuel element or paste used to make it.

DETAILED DESCRIPTION OF A PREFERRED EMBODIMENT

Figure 1:
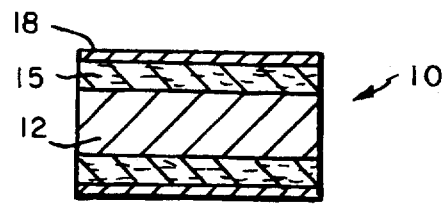
FIG. 1 is a longitudinal sectional view illustrating one embodiment of a fuel component for a smoking article prepared in accord with the teachings of the present invention.

In accord with the present invention, fuel components for a smoking article can be made in a continuous process. Referring to the drawings, and particularly to FIG. 1, each fuel component 10 comprises an extruded composition 12 circumscribed by and bonded to a retaining material 15 and preferably wrapped with an outer paper-like wrapper 18. The components typically have a diameter of about 7–8 mm, with the length varying depending upon the desired heat generating characteristics of the fuel element in the smoking article. The length is also preferably chosen so that, after the fuel element extinguishes, a portion of the fuel element remains which is still bonded to the retaining layer. Fuel elements having other diameters and configurations can readily be made.

For embodiments of the present invention using an extruded composition 12 comprising a carbonaceous fuel material for the fuel element, the fuel material is typically prepared from a fibrous cellulosic material by pyrolysis at from about 400° to 900° C., preferably from about 550° to 750°, in a non-oxidizing atmosphere. The pyrolyzed material is chopped into short fiber lengths, mixed with a binder, water, and other suitable materials, such as sodium carbonate or other source of sodium for optimum lightability and smoldering characteristics, asparagine for tailoring of smoke products, a form of tobacco for flavor production, or other materials as desired, and then extruded into the desired shape. The control the sodium level in the fuel and the use of asparagine are described in U.S. application Ser. No. 07/722,993, of Riggs et al., the disclosure of which is incorporated herein by reference.

The fuel configuration and composition will depend upon the characteristics the fuel element is to have when used in a smoking articel. For example, the fuel elements can be fabricated from a blend containing 90% by weight of Kraft hardwood carbonized pulp, ground to an average particle size of 12 microns and 10% Kelco HV ammonium alginate binder. This blend of carbon powder and binder is preferably mixed together with an aqueous solution of sodium carbonate of appropriate strength to form extrusion mixtures from which the fuel elements are processed into their final form, containing from about 2000 to about 20,000 ppm sodium (Na), as measured using inductively coupled plasma atomic emission spectroscopy (ICP-AES). Approximately 30% by weight of the $Na_2CO_3$ solution may added to the blend in lieu of part or all of the water to form the various extrusion mixtures.

Other suitable sources of carbonaceous materials are coconut hull carbons, such as the PXC carbons available as PCB and the experimental carbons available as Lot B-11030-CAC-5, Lot B-11250-CAC-115 and Lot 089-A12-CAC-45 from Calgon Carbon Corporation, Pittsburgh, Pa.

The hardwood pulp carbon may be prepared, for example, by carbonizing a non-talc containing grade of Grand Prairie Canadian Kraft hardwood paper under a nitrogen blanket, increasing the temperature in a step-wise manner sufficient to minimize oxidation of the paper, to a final carbonizing temperature of at least 750° C. The resulting carbon material is cooled under nitrogen to less than about 35° C., and then ground to fine powder having an average particle size of about 12 microns in diameter (as measured using a Microtrac).

Figure 2:
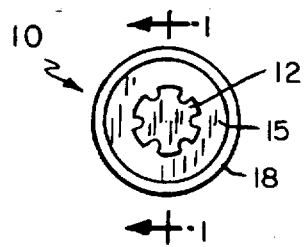
FIG. 2 is an end view of the embodiment in FIG. 1.
Figure 3:
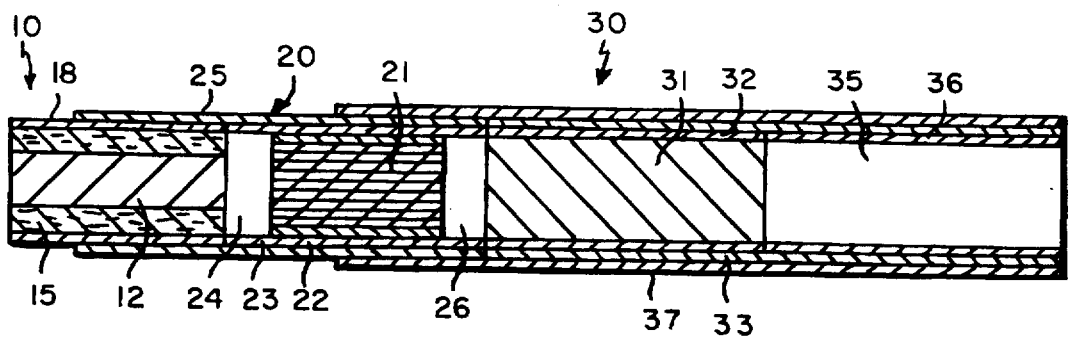
FIG. 3 is a longitudinal sectional view illustrating one embodiment of a cigarette utilizing a fuel component such as that illustrated in FIGS. 1 and 2.

The fuel mixture is extruded through a die which provides the cross-sectional shape to the fuel elements. For example, as shown in FIGS. 1–3, the extruded fuel rods have six equally spaced peripheral slots or grooves, each having a depth of about 0.03 inch and a width of about 0.024 inch. Preferably the internal surface of the groove is rounded as shown, for improved structural integrity.

As described above, the fuel element is retained within the fuel component of the present invention by the retaining layer. Preferably the retaining means circumscribes the entire longitudinal periphery of the fuel element. That layer can also extend beyond either or both ends of the fuel element, effectively recessing the fuel element, separating it from the other components of the cigarette. The preferred resilient nature of the retaining means may allow it to partially extend into any grooves on the periphery of the fuel element. The preferred retaining means also aids in retaining heat and limiting the amount of radial atmospheric air which could otherwise flow to the fuel element during use. The preferred retaining means thus acts as an insulating member.

The retaining material may comprise glass fibers (e.g., Owens-Corning "C" glass), a tobacco filler/glass fiber mixture, gathered or shredded tobacco paper, gathered or shredded carbon paper, tobacco cut filler, or the like.

As shown in FIG. 3, a typical cigarette-type smoking device incorporating the preferred fuel components of the present invention comprise the fuel component 10, which is longitudinally adjacent aerosol generating means 20. The aerosol generating means as depicted comprises a substrate 21, which bears an aerosol forming material, such as glycerol, and a wrap 22, e.g. a barrier paper. The aerosol generating means 20 can conveniently be circumscribed by an overwrap or tube 23 of stiff paper or other suitable material. The aerosol generator means is positioned in the tube 23 so that it is spaced from the ends thereof. Depending on the length of the substrate, a void or space 26 may exist between the substrate and the forward end of the mouthend piece 30. That space may contain tobacco, such as cut filler or tobacco paper, if desired. Preferably, the aerosol generator and the fuel component are joined together by another overwrap paper 25, which may be spaced from the lighting end of the fuel component. The substrate 21 and the fuel element 12 are preferably separated by a space 24, which assists in avoiding migration of the aerosol forming material and avoiding overheating of the substrate.

The cigarette further comprises a mouthend piece 30, made up of a roll 31 of tobacco paper or other suitable material, joined to a low efficiency filter 35, e.g. made of polypropylene or other suitable material.

For ease of handling, the tobacco paper roll 31 and the filter 35 are overwrapped with papers 32 and 36, respectively, and those two components can in turn be combined with an overwrap 33.

Preferably the mouthend piece 30 is joined to the front end of the cigarette by another overwrap of paper 37, as shown in FIG. 3. Preferred fuel compositions, retaining layer compositions, substrates, aerosol formers, and mouthend piece structures are described in greater detail in U.S. application Ser. No. 07/723,350, filed Jun. 28, 1991, the disclosure of which is hereby incorporated by reference.

A preferred aerosol generating means includes an aerosol forming material (e.g., glycerin), tobacco in some form (e.g., tobacco powders, tobacco extract or tobacco dust) and other aerosol forming materials and/or tobacco flavoring agents, such as cocoa, licorice and sugars. The aerosol forming material generally is carried by a substrate, such as gathered paper, gathered tobacco paper, or another form of substrate. Tobacco material can surround the fuel element, the substrate, and/or be employed elsewhere in the smoking articles of the present invention.

Preferably the substrate is a monolithic substrate. When the substrate is a paper-type material, it is highly preferred that such substrate be positioned in a spaced apart relationship from the fuel element. A spaced apart relationship is desired to minimize contact between the fuel element and the substrate, thereby preventing migration of the aerosol forming materials to the fuel as well as limiting any scorching or burning of the paper substrate. The spacing 24 may be provided by the recessed nature of the fuel element in the insulating and retaining means, or by creating a physical space (i.e., a gap) between the fuel element and the substrate during manufacture.

The mouthend piece 30 is provided for delivering aerosol to the mouth of the smoker. Typically, the mouthend piece has a generally tubular shape, and contains tobacco materials (e.g., a cylindrical charge of gathered tobacco) and a filter element.

One suitable fuel composition comprises from about 60 to about 99 weight percent carbon; from about 1 to about 20 weight percent of a suitable binder; from about 1 to about 5 weight percent of an ammonia releasing compound; and from about 2000 to about 20,000 ppm sodium (Na) as measured using inductively coupled plasma atomic emission spectroscopy (ICP-AES). Compounds capable of releasing ammonia under the burning conditions of the fuel composition include compounds such as urea, inorganic and organic salts (e.g., ammonium carbonate, ammonium alginate, or mono-, di-, or tri-ammonium phosphate); amino sugars (e.g., prolino fructose or asparigino fructose); amino acids, particularly alpha amino acids (e.g., glutamine, glycine, asparagine, proline, alanine, cystine, aspartic acid, phenylalanine or glutamic acid); di-, or tri-peptides; quaternary ammonium compounds, and the like. These fuel compositions are described in detail in copending application Ser. No. 07/722,993, of Riggs et al., the disclosure of which is hereby incorporated herein by reference.

Figure 4:
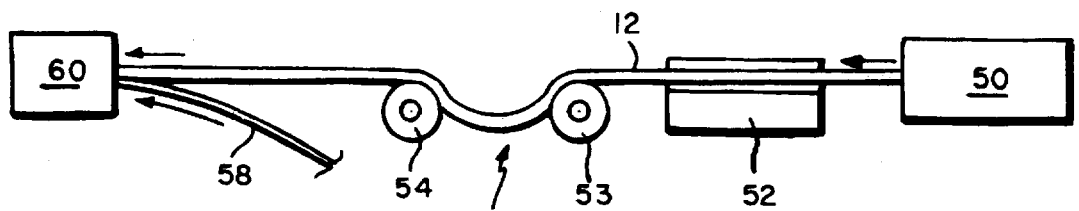
FIG. 4 is a schematic illustration of one embodiment of an apparatus for making components for smoking articles in accord with the present invention.

Referring to FIG. 4, the damp mix may be extruded using a ram piston extruder 50, such as an HET-120A from Hydramet American Inc. The extruded mix 12 exits a die as a continuous extrudate having the desired cross-sectional shape, and is deposited onto an airfoil conveyor 52. The extrudate 12 thence contacts a roller 53, which can be a tachometer, to measure the linear speed of the extrudate flow, which speed can be used to govern the speed of the wrapping means 60, such as the modified KDF-2. Normally the extrudate forms into a delay or lag loop 55 between tach roller 53 and idler roller 54, in order to accommodate variations in speed between components of the apparatus, notably the extruder 50 and the KDF-2 60. Retaining material 58 is provided for circumscribing the extrudate with a layer of material. Preferably, the retaining layer is provided with a material which will assist in forming a bond with the outer surface of the fuel elements, prior to being wrapped around those fuel elements. Where the retaining layer is a glass fiber layer containing for example about 3% to about 5% by weight pectin, the bonding can be brought about by spraying at least a part of the surface of the glass fiber mat with water, sufficiently in advance of the wrapping of the fuel element that the pectin in the glass fiber will be activated to bond to the fuel elements.

The preferred air foil conveyor 52 is a channel comprising a pattern of holes in a plenum supplying low pressure air to support the extrudate as it exits the extruder, and as it moves it to merge or combine with the web of material as it enters the KDF-2 machine. The air foil conveyer may be interrupted, e.g., using idler wheels, to form a loop 55 of extrudate so that variations in speed of the KDF-2 and the extruder will not break the extrudate.

The wrapping means 60 is preferably a commercially available filter making machine, available commercially from Hauni of Hamburg, under the designation KDF-2. The wrapping means both wraps the retaining layer circumscribed fuel element in a paper overwrap, and cuts the composite member into a predetermined length.

Figure 5:
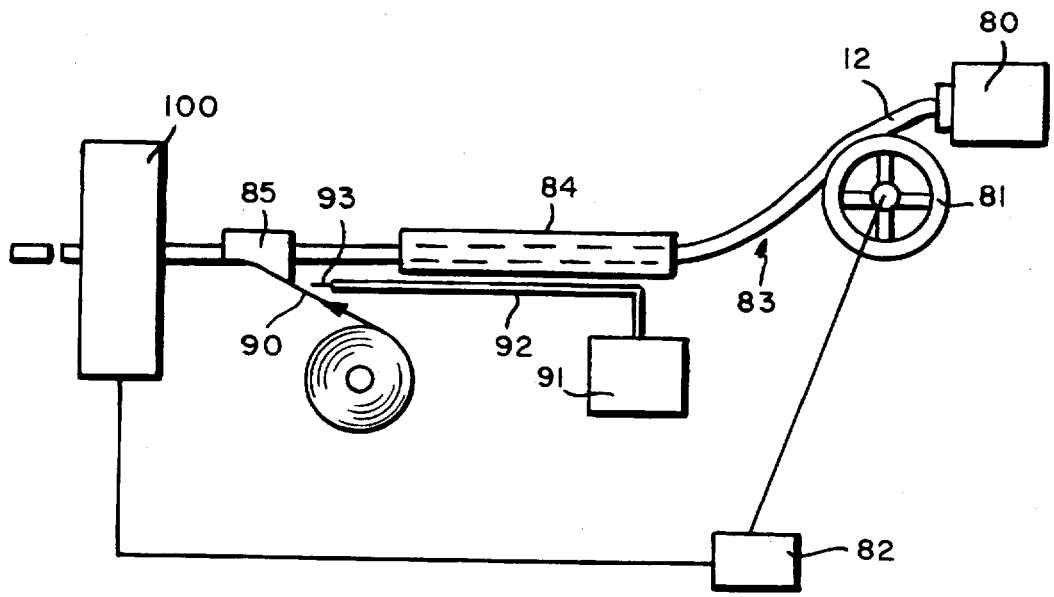
FIG. 5 is a schematic illustration of another embodiment of apparatus for making components for smoking articles in accord with the present invention.

Another preferred embodiment of apparatus for making the fuel components of the present invention is shown schematically in FIG. 5. As shown, the mix is extruded into the desired shape using a compounding extruder, such as a double screw compounding extruder 80. A suitable extruder of that type is a Baker-Perkins MP-50-35 DE XLT extruder; preferably equipped with a screw including a series of forward screw segments, paddle segments and feed screw segments.

Upon exit from the extruder, the extrudate 12 contacts a tachometer wheel 81, whose linear peripheral speed is accurately measured by suitable means. For example, the speed of rotation of the tach wheel can be measured by a photosensor (not shown) arranged to register on the teeth of a gear attached to the tach wheel 81. The signals from the speed sensor are transmitted by a control device 82 to the control which governs the speed of the wrapping and cutting device 100.

After leaving tach wheel 81, the extrudate 12 falls into a delay or lag loop 83, which helps compensate for the difference in production rate between the extruder and the wrapping and cutting device.

The extrudate then enters the airfoil conveyor 84, to be carried to station 85, where the retaining layer of web material 90 is circumscribed around the fuel element. For example, the fuel element may be circumscribed by a resilient mat of Owens-Corning C-glass fibers. For details regarding the properties of this material see pages 48–52 of the monograph entitled *Chemical and Biological Studies of New Cigarette Prototypes That Heat Instead of Burn Tobacco*, R. J. Reynolds Tobacco Co. (1988).

In the wrapping and cutting machine 100, the glass fiber layer is in turn circumscribed by a paper wrapper, preferably the papers described in U.S. Pat. No. 4,938,238, the disclosure of which is incorporated herein by reference.

The components can be made by feeding the extrudate and web of material to, for example, a Hauni KDF-2 filter making machine 60 equipped with a forming device as described in U.S. Pat. No. 4,893,637. The composite member is wrapped with paper described in U.S. Pat. No. 4,938,238, or other cigarette paper wrapping, in the wrapping device. After the wrapping 18 (FIG. 2) is wrapped and sealed around resilient layer 15, the diameter of the composite is fixed. A cutter is arranged transversely of the wrapping device for cutting the wrapped composite into predetermined lengths for further handling in making smoking articles. Typically, the lengths are a multiple of the size desired to be used for each smoking article. For example, if a 10 mm component length is used for each smoking article, the length of the wrapped composite member may be, for example, 40 mm, giving a multiple of 4 fuel components, which can then be cut and joined to corresponding substrates, to make up the front end of the cigarette, which in turn can be joined to individual mouthend pieces to make the cigarettes, as described generally in copending application application Ser. No. 07/723,350, filed Jun. 28, 1991.

As depicted in FIG. 5 a means for bonding the retaining material or mat to the surface of the fuel element includes a source of bonding inducing material 91, a conduit 92 carrying the material to the proximity of the mat being fed to be wrapped around the extrudate, and small diameter tube 93 to spray the bonding inducing material on the surface of the web material 90, prior to wrapping around the extrudate. The location of the means for applying bonding inducing material is dependant on the amount of the bonding inducing material to be used, and any delay period necessary for bonding to be induced sufficiently so that bonds are achieved with the available contact between the fuel element and the circumscribing material.

For example, in the case of a glass fiber mat containing pectin, the bonding inducing material is one which will activate the pectin to form bonds. The preferred bonding material is water. The location of the means for applying bonding inducing material is dependant on the pectin content of the mat, the speed of the system, etc. so that the glass fiber mat is wetted with the activating material sufficiently ahead of time that the pectin or other binding material will be activated by the time it is circumscribed around the fuel element or shortly thereafter. The amount of water used to activate the web material is very small, in the order of about 1% to about 3% by weight of the fuel components.

The bonding inducing agent can be applied to the extrudate using a supply tube and needle-like member with the flow rate controlled by gravity feed from a supply at a predetermined elevation, or by metering, or other suitable means readily supplied by the skilled craftsman.

Figure 6:
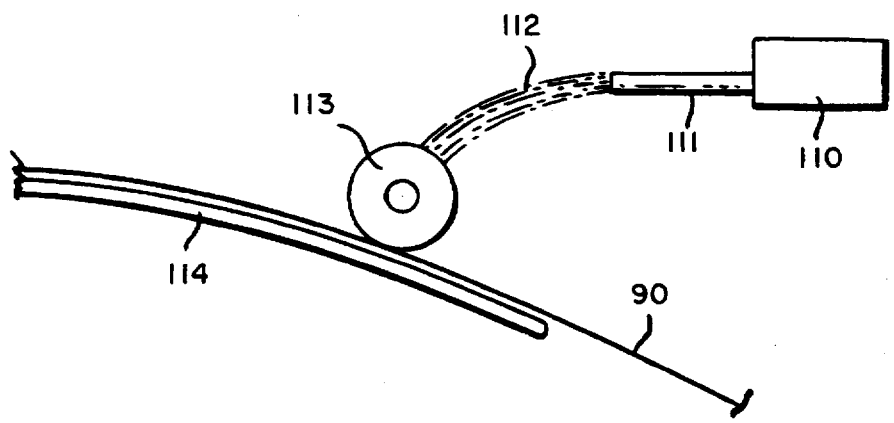
FIG. 6 is a schematic illustration of preferred spray system useable with the apparatus shown in FIG. 4.

A more detailed schematic of a suitable device for applying the bonding inducing material is shown in FIG. 6. The water or other bonding inducing material 112 is derived from source 110 and sprayed through small diameter tube 111 onto a spreader or distributing roller 113. The distributing roller 113 contacts a portion of the surface of the retaining layer which will contact the surface of the fuel element in the finished fuel component. As shown, the roller is spaced to contact the retaining layer 90 as it is fed up an arcuate surface 114 of the wrapping means, as described in U.S. Pat. No. 4,893,637, supra. In practice, the location for applying the bonding inducing material is determined by the speed of the extrudate and other factors as mentioned above, so that sufficient bonding inducing material is applied to the circumscribing material for a sufficient period of time so that adequate bonding can occur. In the case of glass fiber mat, the water is put in contact with the retaining layer for a sufficient time to permit activation of the pectin or other bond-forming material. Preferably the surface of distributing roller 113 is knurled, to aid in the distribution of the bonding inducing material.

To form the bond between the extrudate and the resilient layer, the resilient layer containing the water activatable bonding material is preferably wetted just prior to circumscribing the fuel element. Preferably, water is used as the wetting agent to solubilize or otherwise activate bonding materials on the surface of the material layer for adhesion or bonding with the surface of the extrudate as the water evaporates. Other suitable solvents may be employed depending upon the composition of the circumscribing layer, the composition of the bonding agent, and the composition of the extrudate. An additional bonding agent may also be employed in the solvent or wetting agent, or on the surface of the extrudate, to further promote adhesion or bonding. For example, pectin or NaCMC can be dissolved in the water to promote or provide adhesion between the resilient layer and the extrudate.

Preferred fuel compositions, retaining layer compositions, .aerosol generating means, substrates, aerosol formers, and mouthend pieces, as well as methods for their manufacture into smoking articles, are disclosed in U.S. application Ser. No. 07/723,350, filed Jun. 28, 1991, the disclosure of which is incorporated herein by reference.

In preferred fuel components of the present invention, the fuel element is a carbonaceous material, comprising at least about 50 weight percent elemental carbon. The fuel component is generally at least about 10 mm in length, preferably at least about 12 mm in length. Preferably the maximum length of the fuel element is about 20 mm, with the preferred length being about 16 mm or less. It is preferred that a substantial length of the fuel element be exposed for burning, and a substantial portion of the fuel element be arranged in the smoking article so as not to burn when the smoking article is smoked. This allow the bond between a substantial portion of the fuel element to remain undisturbed by the heat generated in the smoking process. Thus, for a 16 mm long fuel, the first 6 mm may be exposed for burning, with an oxygen barrier or heat sink element placed so that the fuel will normally self extinguish at approximately 6 mm. Smoking of such a smoking article might be expected to disrupt the bonding between the fuel element a little beyond the point of extinguishment, e.g., up to 8 mm from the original lighting end of the fuel element. Yet the bonds between the fuel element and the circumscribing material will hold, e.g., those between 8 mm and 16 mm from the lighting end of the element, thus providing substantial insurance against fallout of the fuel element.

The fuel element in accordance with the present invention can be extruded in a wide variety of shapes.

Materials useful for the compressible resilient overwrap layer 15 in the practice of the present invention can be any material that can be circumscribed around the extrudate 12 to provide a fuel component 10 having an outer cylindrical surface that preferably provides some resilience for manufacturing and during use. The resilient material preferably is heat stable under the conditions of use in a smoking article.

Example of useful materials include glass or ceramic fibers, tobacco, elastomeric compositions, gathered paper webs and the like.

When tobacco or a tobacco containing paper is used to form the resilient layer, the tobacco can release aerosol, e.g., aromas, such as when used for an aerosol generating component in accord with the present invention.

Preferably, the materials used to make the retaining layer in fuel components, in accord with the present invention, are also insulating materials.

As used herein, the term "insulating material" applies to all materials which act primarily as insulators. Preferably, these materials do not burn substantially during use, but they may fuse during use, such as low temperature grades of glass fibers. Suitable insulators have a thermal conductivity in g-cal/(sec) (cm$^2$)(°C./cm), of less than about 0.05, preferably less than about 0.02, most preferably less than about 0.005. See, *Hackh's Chemical Dictionary*, 34, 4th ed., 1969 and *Lange's Handbook of Chemistry*, 10, 272–274 11th ed., 1973. Preferred insulating materials form a layer 15 generally at least about 0.5 mm more preferably at least about 1.0 mm thick. The components of the insulating and/or retaining material which surrounds the fuel element can vary. This material is preferably one which has a tendency not to combust or a material which combusts but does not disintegrate. Examples of suitable materials include glass fibers and other materials of the type described in U.S. patent application Ser. No. 07/601,551, filed Oct. 23, 1990; European Patent Publication No. 336,690; and pages 48–52 of the monograph entitled, *Chemical and Biological Studies of New Cigarette Prototypes That Heat Instead of Burn Tobacco*, R. J. Reynolds Tobacco Co. (1988).

The fuel component 10 is preferably overwrapped with one or more layers of cigarette paper 18. Preferred papers should not openly flame during burning of the fuel element. In addition, the paper preferably should have controllable smolder properties and should produce a grey, cigarette-like ash.

The present invention has been described in detail, including the preferred embodiments thereof. However, it will be appreciated that those skilled in the art, upon consideration of the present disclosure, may make modifications and/or improvements on this invention as set forth in the following claims.

What is claimed is:

1. A method for continuous formation of a fuel component for a smoking article, the method comprising:
   continuously extruding a combustible composition to form extrudate having a preselected shape, continuously wrapping the extruded composition with a compressible, resilient retaining layer of fibrous web material to form a composite member, and bonding the retaining layer to the combustible composition.

2. The method of claim 1, wherein the combustible composition is carbonaceous.

3. The method of claim 1, further including the step of cutting the composite member into predetermined lengths.

4. The method of claim 1, further including wrapping the composite member to define the outer diameter of the composite member.

5. A method for continuous formation of a fuel component for a smoking article, the method comprising:
   continuously extruding a combustible composition to form extrudate having a preselected shape, and continuously circumscribing the extruded composition with a compressible, resilient retaining layer of web material to form a composite member, and bonding the retaining layer to the combustible composition;
   wherein the method further includes wetting the retaining layer prior to the circumscribing step.

6. The method of claim 2, wherein the retaining layer comprises glass fibers containing pectin.

7. A method for continuous formation of a fuel element component for a smoking article, the method comprising:
   continuously extruding a composition comprising a carbonaceous material to form extrudate having a preselected shape, continuously wrapping the extruded composition with a compressible, resilient layer of fibrous web material to form a composite member, bonding the fibrous material layer to the extrudate, and cutting the resulting composite member into predetermined lengths.

8. The method of claim 7, further including wrapping the composite member to determine the outer diameter prior to the cutting step.

9. A method for continuous formation of a fuel component for a smoking article, the method comprising:
   continuously extruding a composition comprising a carbonaceous material to form extrudate having a preselected shape, circumscribing the continuously extruded composition with a compressible, resilient layer of web material to form a composite member, and cutting the resulting composite member into predetermined lengths,
   further including wrapping the composite member to determine the outer diameter prior to the cutting step,
   wherein, prior to the circumscribing step, the method further includes wetting the circumscribing layer.

10. A component for a smoking article, the component comprising an extruded carbonaceous fuel element, the outer surface of which is circumscribed with a compressible, resilient layer of web material adhered with the longitudinal surface of the fuel element.

11. The component of claim 10, further comprising an outer wrapper circumscribing the resilient layer.

12. The component of claim 10, wherein the length is from about 12 to 16 mm.

13. The component of claim 10, wherein the resilient layer comprises glass fibers.

14. The component of claim 10, wherein the resilient layer comprises tobacco.

15. A component for a smoking article, the component comprising an extruded fuel element composition, the outer surface of which is circumscribed with a compressible, resilient layer of material adhered to the longitudinal surface of the extruded composition,
   wherein the extruded composition comprises a carbonaceous material; and
   wherein the resilient layer comprises a gathered web of treated paper.

16. The component of claim 15, wherein the web is embossed.

17. A component for a smoking article, the component comprising an extruded carbonaceous fuel element composition, the outer surface of which is circumscribed with a compressible, resilient layer of material adhered to the longitudinal surface of the fuel element,
   wherein the resilient layer comprises a gathered web of paper.

18. The component of claim 17, wherein the web comprises tobacco or a tobacco product.

19. The component of claim 18, wherein the web is embossed.

20. A smoking article comprising a fuel component, the fuel component comprising a predetermined length of extruded composition, the outer surface of which is circumscribed with a compressible, resilient layer of web material adhered to the longitudinal surface of the extruded composition, the extruded composition comprising a carbonaceous material.

21. The smoking article of claim 20, wherein the resilient layer comprises an insulating material.

22. The smoking article of claim 20, wherein the resilient layer comprises an insulating member.

* * * * *